(12) United States Patent
Everaert et al.

(10) Patent No.: US 11,780,554 B2
(45) Date of Patent: Oct. 10, 2023

(54) DEPLOYMENT SYSTEM FOR AN AIRFOIL HIGH LIFT LEADING EDGE DEVICE

(71) Applicant: Asco Industries NV, Zaventem (BE)

(72) Inventors: Bob Armand Henri Everaert, Ghent (BE); Antoon Marcel Vervliet, Sint-Amands (BE); Geert Roger Greet van Kemenade, Brussels (BE)

(73) Assignee: Asco Industries NV, Zaventem (BE)

( * ) Notice: Subject to any disclaimer, the term of this patent is extended or adjusted under 35 U.S.C. 154(b) by 1057 days.

(21) Appl. No.: 16/226,292

(22) Filed: Dec. 19, 2018

(65) Prior Publication Data

US 2020/0023937 A1 Jan. 23, 2020

(30) Foreign Application Priority Data

Dec. 19, 2017 (EP) ..................................... 17208661

(51) Int. Cl.
| | |
|---|---|
| *B64C 3/50* | (2006.01) |
| *B64C 3/16* | (2006.01) |
| *B64C 3/38* | (2006.01) |
| *B64C 5/10* | (2006.01) |

(52) U.S. Cl.
CPC .................. *B64C 3/16* (2013.01); *B64C 3/38* (2013.01); *B64C 5/10* (2013.01)

(58) Field of Classification Search
CPC .... B64C 3/50; B64C 9/02; B64C 9/08; B64C 9/22; B64C 9/24
See application file for complete search history.

(56) References Cited

U.S. PATENT DOCUMENTS

| | | | |
|---|---|---|---|
| 2,502,315 | A | 3/1950 | Earhart |
| 2,938,680 | A | 5/1960 | Greene |
| 3,486,720 | A | 12/1969 | Seglem |
| 3,556,439 | A | 1/1971 | Autry |
| 4,360,176 | A | 11/1982 | Brown |
| 4,687,162 | A | 8/1987 | Johnson |

(Continued)

FOREIGN PATENT DOCUMENTS

| | | |
|---|---|---|
| CN | 205293063 U | 6/2016 |
| DE | 2054655 A1 | 5/1972 |

(Continued)

OTHER PUBLICATIONS

Office Action from EP App. No. 17208661.3 dated Apr. 22, 2020.

(Continued)

*Primary Examiner* — Richard Green
*Assistant Examiner* — Michael A. Fabula
(74) *Attorney, Agent, or Firm* — Adsero IP (57) ABSTRACT

Deployment system for adjusting a leading edge high-lift device, in particular a slat, between a retracted position, in which, in use, the high-lift device is retracted with respect to an airfoil, and at least one deployed position, in which, in use, the high-lift device is deployed with respect to the airfoil, comprising at least one actuation unit that is configured to actuate the high-lift device between the retracted position and the at least one deployed position, at least one guidance unit that is configured to guide the high-lift device during adjustment between the retracted position and the at least one deployed position along an adjustment path, wherein the guidance unit is independent from the actuation unit.

22 Claims, 5 Drawing Sheets

(56) References Cited

U.S. PATENT DOCUMENTS

| | | | |
|---|---|---|---|
| 4,753,402 A | 6/1988 | Cole | |
| 4,838,503 A | 6/1989 | Williams | |
| 5,544,847 A | 8/1996 | Bliesner | |
| 5,681,013 A | 10/1997 | Rudolph | |
| 5,836,550 A | 11/1998 | Paez | |
| 7,798,450 B2 | 9/2010 | Patzelt | |
| 8,181,913 B2 | 5/2012 | Jaggard | |
| 8,393,799 B2 | 3/2013 | Dahl | |
| 8,628,045 B2 | 1/2014 | Lauwereys | |
| 8,844,878 B2 | 9/2014 | Voss | |
| 9,452,823 B2 | 9/2016 | Havar | |
| 9,573,673 B2* | 2/2017 | Parker | B64C 9/02 |
| 9,616,989 B2 | 4/2017 | Parker | |
| 10,040,540 B2* | 8/2018 | Bishop | B64C 9/16 |
| 10,589,839 B2* | 3/2020 | Schlipf | B64C 13/30 |
| 10,919,616 B2 | 2/2021 | Vervliet | |
| 2004/0065783 A1* | 4/2004 | Robinson | B64C 9/16 244/216 |
| 2005/0040294 A1 | 2/2005 | Perez-Sanchez | |
| 2007/0102587 A1 | 5/2007 | Jones | |
| 2009/0127402 A1 | 5/2009 | Jaggard | |
| 2009/0146014 A1 | 6/2009 | Gyuricsko | |
| 2010/0116944 A1 | 5/2010 | Wollaston | |
| 2010/0163685 A1 | 7/2010 | Vormezeele | |
| 2010/0258674 A1 | 10/2010 | Sutton | |
| 2011/0036944 A1 | 2/2011 | Mann | |
| 2011/0101175 A1 | 5/2011 | Lauwereys | |
| 2011/0168849 A1 | 7/2011 | Parker | |
| 2011/0253832 A1 | 10/2011 | Wildman | |
| 2011/0290945 A1 | 12/2011 | Peirce | |
| 2011/0290946 A1 | 12/2011 | Peirce | |
| 2012/0012712 A1 | 1/2012 | Eden | |
| 2012/0241564 A1 | 9/2012 | Parker | |
| 2012/0325976 A1 | 12/2012 | Parker | |
| 2013/0025646 A1 | 10/2013 | Maenz | |
| 2013/0256461 A1 | 10/2013 | Maenz | |
| 2013/0301049 A1 | 11/2013 | Teague | |
| 2013/0334364 A1 | 12/2013 | Parker | |
| 2014/0042276 A1* | 2/2014 | Parker | B64C 9/02 244/214 |
| 2014/0339358 A1* | 11/2014 | Swartley | B64C 9/22 439/32 |
| 2015/0298795 A1 | 10/2015 | Parker | |
| 2016/0083081 A1* | 3/2016 | Cowles, Jr | F16C 17/10 384/570 |
| 2016/0083082 A1* | 3/2016 | Bishop | B64C 9/24 244/99.3 |
| 2018/0141637 A1* | 5/2018 | Schlipf | B64C 9/22 |
| 2018/0178900 A1* | 6/2018 | Lorenz | B64C 13/34 |
| 2018/0178901 A1* | 6/2018 | Schlipf | B64C 9/24 |
| 2018/0312243 A1 | 11/2018 | Vervliet | |

FOREIGN PATENT DOCUMENTS

| | | |
|---|---|---|
| EP | 0100775 A | 2/1984 |
| EP | 0873937 B1 | 11/2003 |
| EP | 2134597 B1 | 6/2011 |
| EP | 2282930 B1 | 2/2012 |
| EP | 2 669 191 | 12/2013 |
| EP | 2318269 B1 | 1/2015 |
| EP | 2421751 B1 | 5/2016 |
| EP | 3339163 A1 | 6/2018 |
| GB | 404 149 | 1/1934 |
| GB | 517422 A | 1/1940 |
| GB | 2458683 A | 9/2009 |
| WO | WO 2005/077756 | 8/2005 |

OTHER PUBLICATIONS

European Search Report from EP App No. 17208661 dated Apr. 9, 2018.

Extended European Search Report from EP App No. 17168255.2 dated Oct. 26, 2017.

\* cited by examiner

DEPLOYMENT SYSTEM FOR AN AIRFOIL HIGH LIFT LEADING EDGE DEVICE

RELATED APPLICATIONS

This application claims priority to European Application No. 17208661.3, filed Dec. 19, 2017, which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

Deployment systems for airfoil high-lift leading edge devices.

BACKGROUND

Airfoil high-lift leading edge devices are widely used for airfoils. They can be moved between a retracted position and at least one deployed position, in which they are arranged to improve the aerodynamic performance of the aircraft at higher angles of attack without stalling, for example during take-off, climb, descent or landing. In deployed position, the high-lift device provides for additional aerodynamic loads during certain stages of a flight, in particular during low speed stages. Leading edge high-lift devices can be embodied as flap, e.g. leading edge slotted flap, typically referred to as slat, or as a Krueger flap. Many embodiments of a leading edge high-lift device can be possible.

Leading edge high-lift devices, in particular slats, are movable between a retracted and a deployed position by means of a movable track. The track is connected to the slat and moves in and out of the leading edge of the airfoil over rollers that are fixedly mounted to the airfoil. The track is provided with a rack at an underside thereof, which rack is in engagement with a pinion. The pinion is connected to a drive system, typically an elongated rod extending in spanwise direction on which the pinion is mounted. A drawback of this known system is that the track, to which the slat is fixedly connected, penetrates through the front spar of the wing into the fuel tank in retracted position. This requires additional components, such as a track can and sealing to avoid possible leakage of the fuel tank. Also, due to the penetration of the front spar, additional reinforcements may be required as well to compensate for loss of strength due to the hole in the front spar. Furthermore, during assembly, the system is sensitive to misalignment and requires narrow tolerances. This makes the system difficult and time consuming to assemble, increasing costs.

Therefore, there is a need for an improved system for adjusting a leading edge high-lift device, in particular a slat, between a retracted position and at least one deployed position. In particular, it is an object of the invention to provide for a leading edge high-lift deployment device that is relatively simple, reliable and/or easy to manufacture. More in particular, it is an object of the invention to provide for a leading edge high-lift deployment device that is avoiding a penetration of the front spar.

The present disclosure is directed toward overcoming one or more of the problems discussed above.

SUMMARY OF THE EMBODIMENTS

Disclosed is a leading edge high-lift device deployment system for adjusting a leading edge high-lift device, in particular a slat, between a retracted position, in which, in use, the high-lift device is retracted with respect to an airfoil, and at least one deployed position, in which, in use, the high-lift device is deployed with respect to the airfoil, comprising: at least one actuation unit that is configured to actuate the high-lift device between the retracted position and the at least one deployed position; at least one guidance unit that is configured to guide the high-lift device during adjustment between the retracted position and the at least one deployed position along an adjustment path; wherein the guidance unit is independent from the actuation unit; wherein the guidance unit comprises a track arranged for fixedly mounting to the airfoil and a carriage for cooperation with the track, wherein the carriage is movable with respect to the track and is arranged for mounting to the high-lift device.

By providing a deployment system comprising an actuation unit and a guidance unit that are independent from each other, the deployment system can become sufficiently compact to fit in a space in the nose of an airfoil, i.e. the space in front of the front spar of the airfoil. As such, penetration of the front spar of the airfoil can be avoided. Thus, complex measures to secure and seal the fuel tank to accommodate the track extending in the fuel tank, can be obviated. Also, the stiffness of the front spar can remain unaffected as there is no penetration of the front spar required anymore.

By providing an independent actuation unit and an independent guidance unit, the functions of actuating and of guiding are being separated. By separating these functions, the actuation unit and the guidance unit can be embodied independently of each other, which allows for a more compact deployment system. The actuation unit and the guidance unit are independent from each other, both spatially, they are positioned spatially apart, namely at a distance from each other, as functionally, the actuation unit provides for the actuation only, and the guidance unit provides for the slat following the predefined path. There is no actuation and guidance combined in a single unit, contrary to prior deployment systems.

Since the actuation unit is fully independent of the guidance unit, the actuation unit can be positioned in the nose of the airfoil such that it completely fits, also when deployed, in the space available in the nose of the airfoil in front of the front spar. Contrary to the prior art, no openings in the high-lift device and/or the airfoil thus have to be provided on the aerodynamic surfaces that are wetted in retracted position to accommodate the positioning of the deployment system. Since these openings can be omitted, also any coverings for covering such openings can be omitted, which provides for weight savings and cost savings, reduces assembly time and also improves reliability, as such coverings often were difficult to attach smoothly to the airfoil and/or high-lift device and often came loose.

As the actuation unit is independent from the guidance unit, there is no functional dependency between the actuation unit and the guidance unit as in the prior art systems. In the prior art systems, the rack-and-pinion is arranged at an underside of the track, thus there is a direct functional and mechanical connection between the rack-and-pinion and the track. As there is no dependency between the actuation unit and the guidance unit, the actuation unit provides for the movement only, it pushes or pulls the high-lift device. The guidance unit then follows this movement along the predetermined adjustment path defined by the track. The actuation unit provides for the actuation of the high-lift device and is thus the driving unit. The track, for example embodied as a rail, is fixedly mounted to the airfoil, and as such is fixed with respect to the airfoil, while the slat is movable with respect to the airfoil. The carriage, often embodied with rollers, is connected to the slat. The carriage is arranged to move over the track, for example the rollers have contact with the track to allow movement of the carriage over the track. The carriage comprises at least one pair of rollers that are in contact with the track for movement over the track, such that the rollers move over a surface of the track and the carriage is moved with respect to the track while the track is in fixed position with respect to the airfoil. The track is configured to be mounted to a rib of the airfoil, but does not extend through the front spar of the airfoil, such that there is no front spar penetration. The track can be allowed to penetrate the trailing side of the slat to allow for sufficient deployment length. wherein The guidance unit provides that the high-lift device follows the predefined path during the deployment and can thus be considered as the driven unit as it follows the movement induced by the actuation unit. According to the invention, the actuation unit is only there to move the high-lift device, during movement from a retracted position to a deployed position. The actuation unit in fact pushes the high-lift device such that the actuation unit becomes extended. During movement from a deployed position to retracted position of the high-lift device, the actuation unit in facts pulls the high-lift device such that the actuation unit becomes retracted or folded. Also, in the deployed position of the high-lift device, in particular during flight conditions, the actuation unit needs to maintain the high-lift device in the deployed position as there is no stop or other fixation mechanism in the guidance unit to hold the high-lift device in the deployed condition. As such, the actuation unit needs to take up loads, aerodynamic and other, from the high-lift device and to direct these loads to the airfoil structure, for example to a rib and/or a front spar of the airfoil. The guidance unit itself is arranged to take up the remaining loads from the high-lift device. The shape of the track of the guidance unit determines the adjustment path, independent from the actuation unit.

The actuation unit itself is not arranged to provide for an adjustment path and is thus functionally separate from the guidance unit. For the adjustment path, there is separately provided a guidance unit that provides for guiding of the high-lift device along a predetermined adjustment path. Thus, the actuation unit provides for the force for moving the high-lift between the retracted position and the at least one deployed position. The guidance unit ensures that during movement of the high-lift device, a predetermined adjustment path is followed such that the correct predetermined retracted position and a correct deployed position is reached.

Advantageously, the actuation unit is embodied as a link-and-lever mechanism. By providing such a link and lever mechanism, the actuation unit can be folded very compact, such that it fits, in folded condition, in the limited space available in front of the front spar of the airfoil, typically between the front spar of the airfoil and the trailing side of the slat. The trailing side of the slat is considered to be formed by the rear surface of the slat, whereas the leading side of the slat is considered to be formed by the skin surface. In particular, the link and lever mechanism may have two movable links, of which one link is connected to a drive source, such as a drive rod, whether or not via an additional reduction gearbox, and of which the other link is movable connected to a connection lug on the slat. These two links can be folded compactly in a V-shaped fashion with a sharp angle between them, with one link close to the other link. In deployed position, the two links can be extended with respect to each other, with a large angle between them. The link and lever mechanism provides for the actuation unit, and, as such, does not provide for any path or guidance. The link and lever mechanism is adjustable between a folded position in a V-shaped fashion when the slat is in retracted position and an extended position when the slat is in deployed position The link and lever mechanism pushes the slat outwardly during deployment and pulls the slat inwardly during retraction, but does not keep the slat on a predefined path. The guidance unit keeps the slat on the predefined path during deployment and retraction with the carriage moving onto the track that is fixedly mounted to the airfoil.

In the retracted position, the high-lift device, such as a slat, is retracted with respect to the airfoil, so that it may abut the nose of the airfoil. The deployment system is then retracted as well, with the guidance unit in a retracted state, e.g. the carriage may be positioned at one end of the track. The actuation unit is then retracted, or, depending on the embodiment of the actuation unit, folded. In the at least one deployed position, the high-lift device is at a distance with respect to the airfoil, in some embodiments a slot may be defined between the airfoil and the leading edge high-lift device. The deployment system is extended with the guidance unit in extended state as well, e.g. the carriage is at a different position along the track than in the retracted state and has moved along the track. The actuation unit is then extended as well, having pushed the high-lift device somewhat outwardly with respect to the retracted position.

As the guidance unit is fully independent from the actuation unit, the guidance unit can be, but does not have to be, positioned at a distance, in spanwise direction, from the actuation unit. As such, an optimal load distribution can be obtained between actuation units and guidance units. For example, over a span length of a high-lift device, two actuation units may be provided to obtain a fail safe construction, e.g. one actuation unit at both ends of the high-lift device, for example at ⅓ of the length from the end of the high-lift device. Then, multiple guidance units can be provided that may be evenly distributed over the span length of the high-lift device. Thus, an optimal distribution of actuation units and guidance units can be provided, which may provide for an optimal weight. Also, as the actuation unit is independent of the guidance unit, assembly can become much simpler, faster and easier.

Advantageously, the guidance unit is arranged for positioning entirely in front of a front spar of the airfoil, seen in chordwise direction of the airfoil. Since according to the invention, the guidance unit is independent of the actuation unit having no interaction with the actuation unit, the guidance unit can become sufficiently compact such that it fits in the space available in front of the front spar of the wing. When assembled, the guidance unit thus fits in the space in the nose of the airfoil, in front of the front spar. In some embodiments, the track of the guidance unit can extend through a trailing side of the high-lift device, for example to provide for sufficient length of the adjustment path.

Advantageously, the track is arranged for connection to a rib of the airfoil, in particular to a rib of the nose of the airfoil. As such, a firm connection between the airfoil and the track can be established. Also, all loads that occur on the track can thus be transferred directly to the airfoil structure via the rib connection.

The track of the guidance unit is advantageously comprised of two C-shaped rails that are mounted opposite each other, such that the openings of the "C"-shapes face each other. By positioning the C-shaped rails such that the openings thereof face each other, a receiving space is provided to receive the carriage of the guidance unit therein. As such, a simple track construction can be obtained. Various embodiments of the track are possible, for example an I-shaped track is possible as well, or a T-shaped track, or any other variant. The carriage is in contact with the track, for example at least one pair of rollers of the carriage can move over the track, to allow movement of the carriage with respect to the track, and, thus, guidance of the slat with respect to the airfoil along a path defined by the shape of the track.

The carriage advantageously is provided with at least one pair of rollers, having a rotational axis oriented mainly in spanwise direction, wherein the rollers are receivable in the track, in particular in a receiving space defined by the C-shape of the track. As such, as the deployment of the high-lift device is driven by the actuation unit, the carriage follows a path determined by the shape of the track. More advantageously, the carriage may also be provided with side rollers so that slanting of the carriage in the track can be minimized or avoided and/or so that side loads, mainly spanwise oriented loads, can be transferred from the carriage to the track and subsequently to the airfoil.

Advantageously, the carriage is arranged for connection to the high-lift device at one end of the carriage. Further, the at least one pair of rollers is mounted to the carriage at an end of the carriage opposite of the end for connection to the high-lift device. As such, the carriage can have a somewhat elongated shape that may correspond with the shape of the track, which may facilitate the movement of the carriage in the track.

The deployment system comprises at least one actuation unit and at least one guidance unit. Preferably, the deployment system comprises multiple guidance units wherein a single one of the guidance units is provided as a master guidance unit of which the carriage is arranged for a mounting to the high-lift device that does not allow any translational movement of the high-lift device with respect to the guidance unit, and wherein the other guidance units are provided as slave guidance units of which the carriage is arranged for a mounting to the high-lift device that allows some relative movement of the high-lift device with respect to the guidance unit in spanwise direction only. Advantageously, the master guidance unit can be hingedly connected to the high-lift device, allowing hinge motion only, so that translational movement in spanwise direction is not accommodated. The slave guidance units can be mounted to the high-lift device, for example using two, or more, lugs that are at one side hingedly connected to the guidance unit and at the other side hingedly connected to the high-lift device, thus allowing rotational movement as well as some spanwise translational movement. When assembled, the master guidance unit is mounted to the high-lift device allowing no translational movement of the carriage with respect to the high-lift device and the slave guidance units are hingedly mounted to the high-lift device allowing at least one degree of freedom, preferably a rotation degree of freedom. More advantageously, two degrees of freedom are allowed, a rotation degree of freedom and a translation degree of freedom. For example, a lug can be provided that at one end is hingedly connected to the carriage and at the other end is hingedly connected to the high-lift device. Then, some relative movement, in particular translation, of the high-lift device with respect to the guidance unit, e.g. due to tolerances, thermal dilatation, wing bending, centrifugal effects, in-flight motions etc., can easily be taken by the guidance unit.

The disclosure further relates to a set of guidance and actuation units for use in such a deployment system.

Further advantageous embodiments are represented in the claims.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. It is noted that the figures are only schematic representations of embodiments of the invention that are given by way of non-limiting example.

FIG. 6b a schematic top view of the carriage of the guidance unit of FIG. 6a;

DETAILED DESCRIPTION

While various aspects and features of certain embodiments have been summarized above, the following detailed description illustrates a few embodiments in further detail to enable one of skill in the art to practice such embodiments.

The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
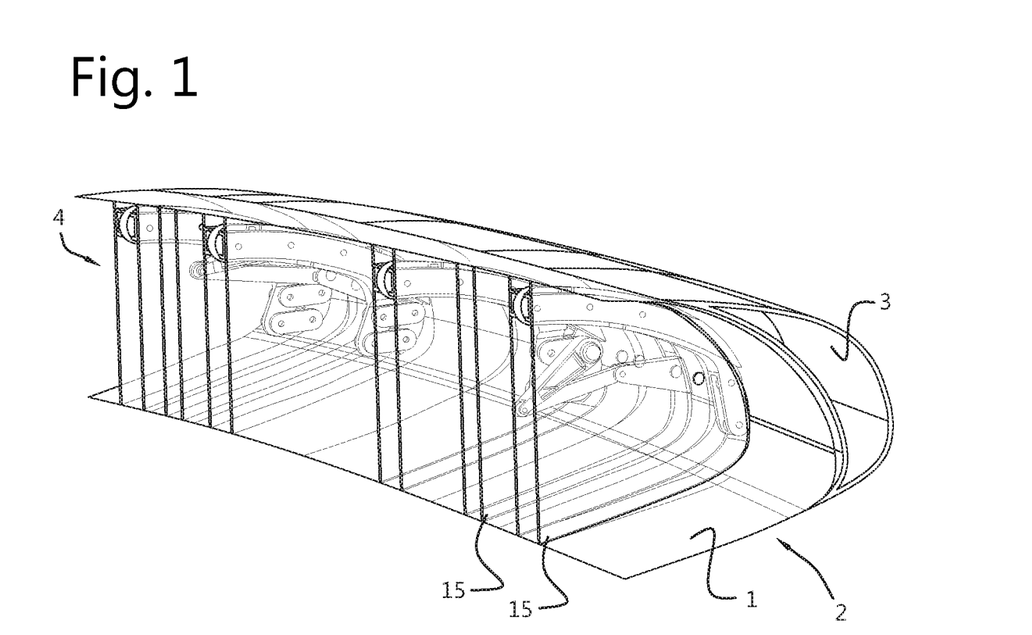
FIG. 1 a schematic perspective view of a nose of an airfoil provided with a high-lift device in retracted position and a deployment system according to the disclosure.

FIG. 1 shows a schematic perspective general overview of a nose 1 of an airfoil 2 provided with a high-lift device 3. The high-lift device 3 is here embodied as a slat that is adjustable with respect to the airfoil 2 between a retracted position and at least one deployed position. In the retracted position, the high-lift device 3 is retracted with respect to the airfoil 2, as shown in FIG. 1. In some embodiments, the high-lift device 3 abuts the nose 1 of the airfoil 2.

FIGS. 3a, 3b, 4a and 4b show the high-lift device 3 in deployed positions.

For adjusting the high-lift device 3, a deployment system 4 is provided. The deployment system 4 comprises at least one actuation unit 5 and at least one guidance unit 6. The actuation unit 5 is configured to actuate the high-lift device 3 between the retracted position and the at least one deployed position. The guidance unit 6 is configured to guide the high-lift device 3 during adjustment along a predetermined adjustment path.

As can be seen in the figures, the actuation unit 5 is independent from the guidance unit 6. In this embodiment, the actuation unit 5 is even positioned at a distance, in spanwise direction, from the guidance units 6. Alternatively, the guidance unit 6 and the actuation unit 5 can be mounted at the same location, though remaining independent and functionally separate. Here, in this embodiment, two actuation units 5 are provided, one actuation unit 5 at each end of the high-lift device 3, typically an actuation unit 5 can be provided at ⅓ of the span length of the high-lift device, and another actuation unit 5 can be provided at ⅔ of the span length of the high-lift device. As such, a fail-safe configuration for the actuation is obtained, such that, should one actuation unit 5 fail, there is still a second actuation unit 5 that can perform the function of actuating, or at least retaining, the high-lift device 3. The actuation unit 5 is fully independent from the guidance unit 6, there is no interaction, mechanically or functionally, between the actuation unit 5 and the guidance unit 6. The actuation unit 5 solely provides for the movement of the high-lift device 3.

Figure 2:
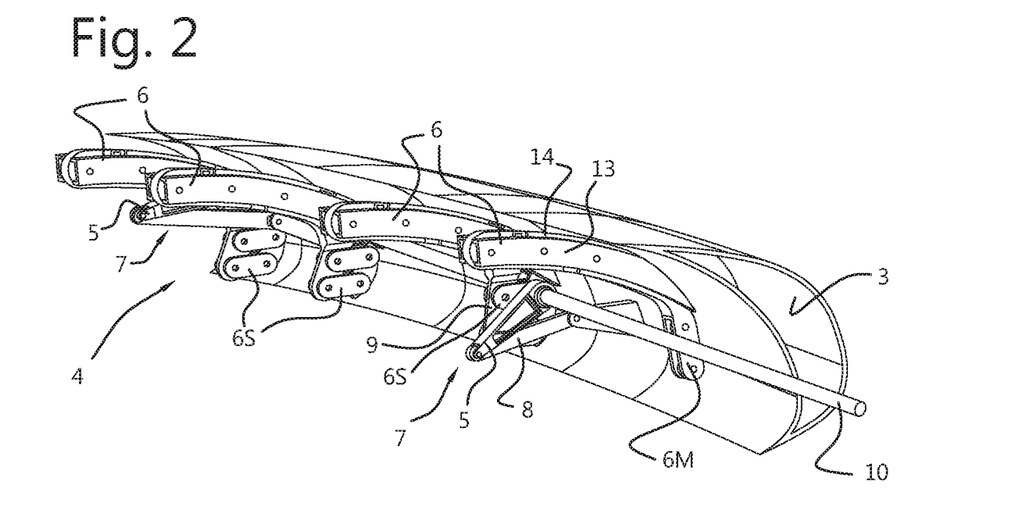
FIG. 2 a schematic perspective view of the deployment system in retracted position.
Figure 3A:
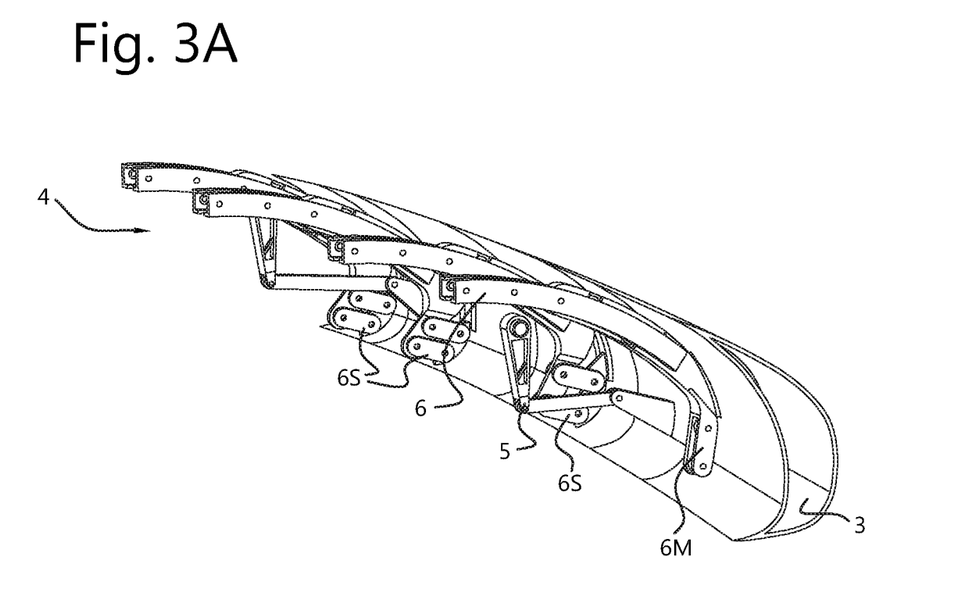
FIG. 3a a schematic perspective view of the deployment system in a deployed position, here in an intermediate take-off position.
Figure 3B:
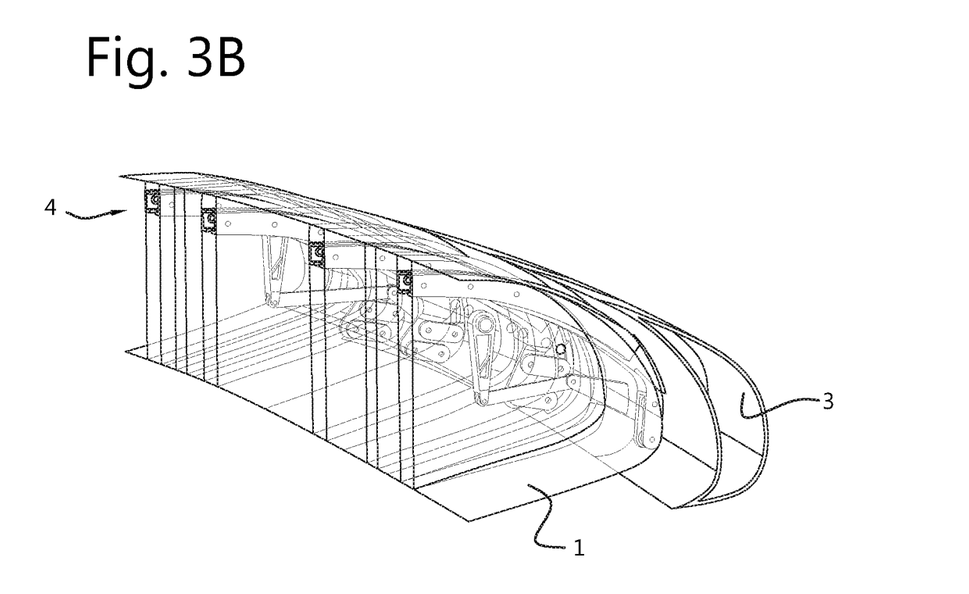
FIG. 3b a schematic perspective view of the deployment system of FIG. 3a in which also the nose of the airfoil is shown.
Figure 4A:
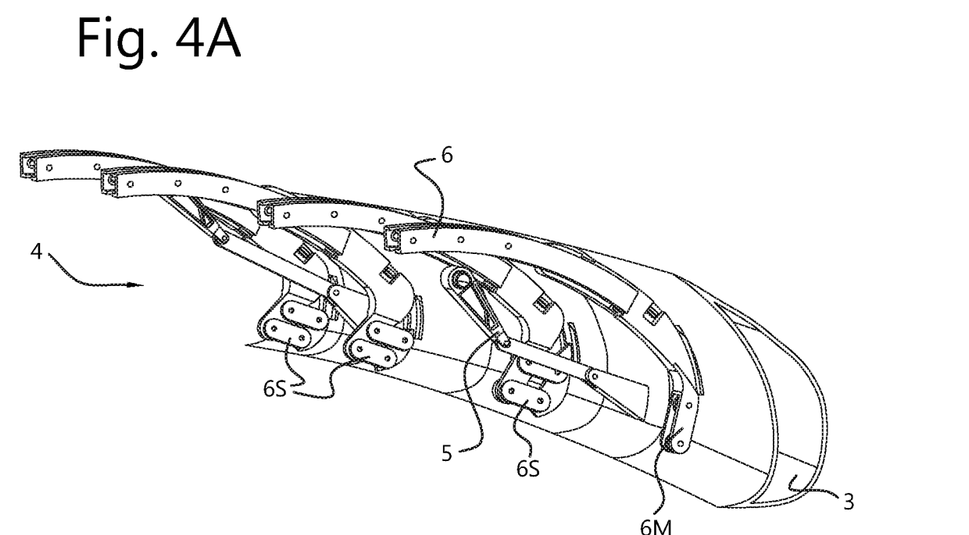
FIG. 4a a schematic perspective view of the deployment system in a deployed position, here in fully extended position.
Figure 4B:
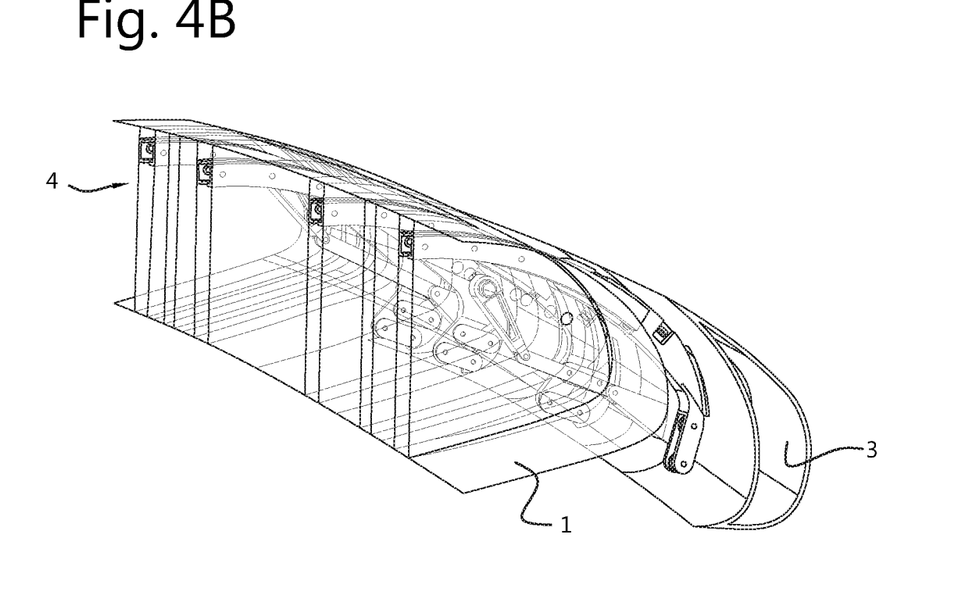
FIG. 4b a schematic perspective view of the deployment system of FIG. 4a in which also the nose of the airfoil is shown.
Figure 5:
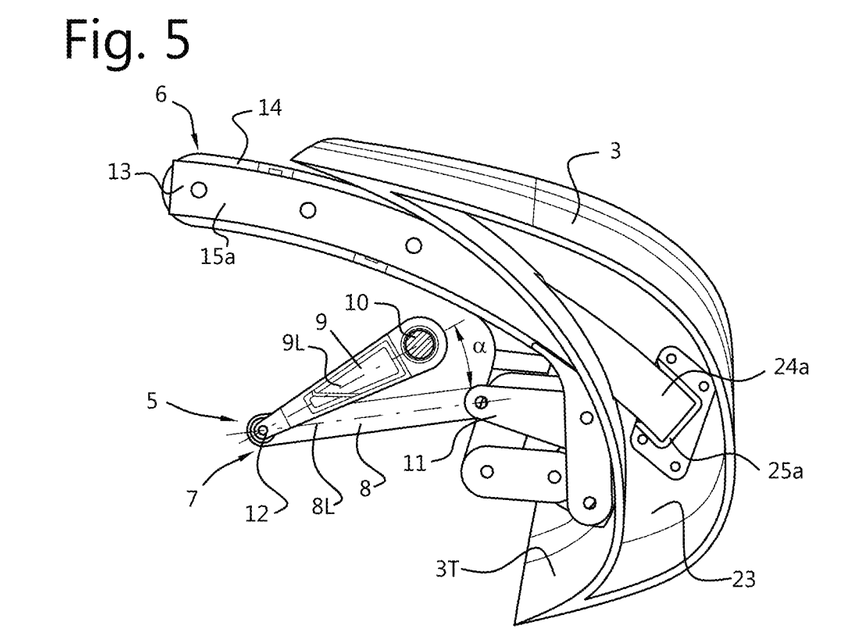
FIG. 5 a schematic side view of the deployment system connected to the high-lift device.

The actuation unit 5 is here embodied as a linkage mechanism, more in particular a link and lever mechanism 7 is disclosed. This is shown in more detail in FIG. 5. There are thus two components, a link 8 and a lever 9 provided of which the link 8 is arranged for mounting to the high-lift device 3 and the lever 9 is arranged for connection to a drive rod 10, such that, in use, when the drive rod 10 is driven, the actuation unit 5 is extended or retracted to adjust the high-lift device 3 between the at least one deployed position and the retracted position. The link 8 is via a lug 11 connected to the high-lift device 3, in particular to a trailing side 3T of the high-lift device 3. The link 8 and the lever 9 are hingedly connected to each other at hinge 12. The drive rod 10 forms part of a drive unit for driving the actuation units. The drive rod 10 is typically a rod longitudinally extending in spanwise direction in the nose 1 of the airfoil 2. At determined positions on the drive rod 10, an actuation unit 5 is connected. Such that, when the drive rod 10 rotates, the actuation unit 5 moves, and the link 8 and lever 9 of the actuation unit 5 are moved as well. The connection between the lever 9 and the drive rod 10 can be any well-known connection to rotationally mount the lever 9 to the drive rod 10. By rotating the drive rod 10, and thus the lever 9, the enclosed angle between the link 8 and the lever 9 changes. In the retracted position, as shown in FIG. 2 and FIG. 5, the enclosed angle alpha is relatively small, between about 5 to about 25 degrees. In a deployed position, such as the intermediate position shown in FIGS. 3a, 3b, the enclosed angle alpha is larger, for example between about 60 to about 100 degrees for the intermediate take-off position as shown in FIGS. 3a, 3b. In a fully extended position, as shown in FIGS. 4a, 4b, the enclosed angle alpha is largest, between about 140 to about 170 degrees. The enclosed angle alpha typically can be measured between a first centerline 8L of the first lever 8 through the rotation centers of the hinges at both ends of the lever 8, and between a second centerline 9L of the first lever 9 through the rotation centers of the hinges at both ends of the lever 9.

Many variants of an actuation unit fully independent of a guidance unit are possible.

Since the actuation unit 5 is now fully independent of the guidance unit 6, the actuation unit 5 can become more compact. Also, the actuation unit 5 can now be positioned in the nose 1 of the airfoil 2 at a position that is optimal for space allocation reasons. As such, it can be seen, for example in FIG. 5, that the actuation unit 5 is positioned about halfway of the height of the high-lift device 3. So, even in retracted position, when the actuation unit 5 is fully folded, the actuation unit 5 can remain completely in the space provided by the nose 1 of the airfoil 2, front of the front spar (not shown), as can for example be seen in FIG. 1. Also, due to the compactness of the actuation unit 5, also when fully extended, the actuation unit 5 can remain completely in the space provided by the nose 1 of the airfoil 2, as can for example be seen in FIG. 4b.

As follows from the geometry and the mechanics of the link and lever mechanism 7 as shown here, the actuation unit 5 only provides for movement of the high-lift device 3. The link and lever mechanism 7 simply pushes the high-lift device outwardly to a deployed position, or pulls the high-lift device 3 inwardly to the retracted position. No guidance or adjustment path can be provided by the link and lever mechanism 7 as actuation unit 5.

Figure 6A:
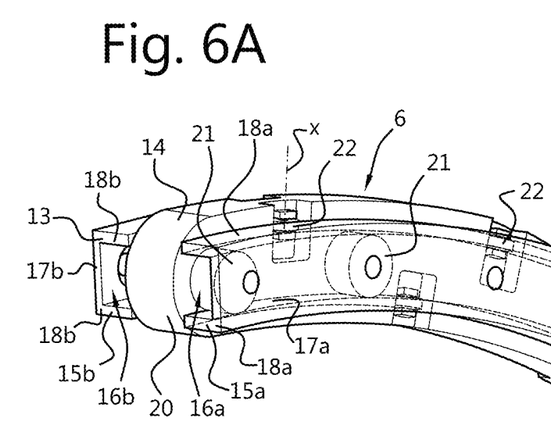
FIG. 6a a schematic perspective view of a guidance unit of the deployment system.
Figure 6B:
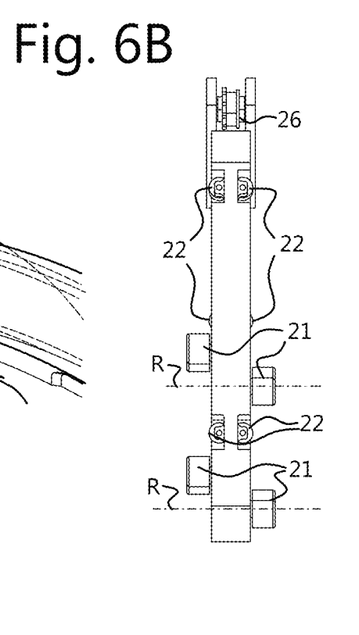

The guidance unit 6 is thus configured to guide the high-lift device 3 during adjustment, induced by the actuation unit 5, between the retracted position and the at least one deployed position. Thereto, the guidance unit 6 comprises a track 13 and a carriage 14 for cooperation with the track 13. FIG. 5 and FIG. 6 show the guidance unit 6 in more detail.

The track 13 is configured to fixedly mount to the airfoil 2. For example, the track 13 can be connected to a rib 15 of the airfoil 2. All loads transferred from the high-lift device 3 to the guidance unit 6 can easily be transferred to the airfoil via the connection to the ribs 15. The carriage 14 is movable with respect to the track 13 and is arranged for connection to the high-lift device 3.

In this embodiment, the track 13 is comprised of two C-shaped rails 15a, 15b that are mounted opposite each other, an opening 16a, 16b of the C-shape facing each other. The C-shaped rail 15a, 15b comprises a back side 17a, 17b enclosed by two transverse sides 18a, 18b such that a C-shape occurs. Between the sides 18a, 18b opposite the side 17a, 17b respectively an opening 16a, 16b occurs. The opening 16a of the rail 15a faces the opening 16b of the rail 15b, thus creating a receiving space 20 for the carriage 14. Instead of a C-shaped rail, other tracks are possible, such as, but not limited to, a T-shaped rail, or L-shaped rail.

The shape of the track 13, and thus of the rails 15a, 15b determines the adjustment path in approximately chordwise direction. This is the path that the high-lift device follows during adjustment between the retracted position and at least one deployed position. This path is solely determined by the guidance unit 6, and defined by the shape of the track 13, in particular of the C-shaped rails 15a, 15b.

The carriage 14 comprises at least one pair of rollers 21. In the embodiment shown, there are two pairs of rollers 21 provided. However, it may also be possible that more than two pairs of rollers 21 may be provided. The rollers 21 have a rotational axis R that is mainly oriented in a direction transverse to the carriage 14, corresponding with an approximately spanwise direction. The pair of rollers 21 can have a common rotation axis, or the respective rotation axes of the rollers 21 of one pair can be approximately parallel to each other. The track 13, and rails 15a, 15b, is dimensioned to receive the rollers 21, which rollers 21 are dimensioned to transfer the loads from the carriage 14 to the track 13 and subsequently to the airfoil. The rollers 21 can then move in the rails 15a, 15b. The carriage 14 can further be provided with side rollers 22. The side rollers 22, usually provided in pairs as well, roll against the inside surfaces of the transverse sides 18a, 18b of the C-shaped rails 15a, 15b and may thus obviate slanting of the carriage 14 in the track 13 and may ensure a transfer of the side loads that may occur on the carriage 14 towards the track 13 and the airfoil 2. The side rollers 22 have a rotational axis X that extends in a direction corresponding to a height direction of the carriage, resulting, in use, in an upward direction.

The carriage 14 further has a shape that corresponds to the shape of the track 13, as can be seen for example in FIG. 5. By providing the carriage 14 and the track 13 with a corresponding shape, the guidance unit can become relatively compact. It can become sufficiently compact such that it fits entirely in front of the front spar of the airfoil, i.e. in the nose of the airfoil. Thus, penetration of the front spar can be avoided and complex measures to cover and seal off the penetration can be omitted. This provides for a significant cost reduction and assembly time reduction.

In some embodiments, the track 13 of the guidance unit 6 can be configured to extend through the trailing side 3T of the high-lift device 3. This can allow for a sufficiently long adjustment path without impairing strength or stiffness of the nose of the airfoil, or of the high-lift device. For example, as shown in FIG. 5, each C-shaped rail 15a, 15b can be mounted at either side of a rib 23 of the high-lift device. The rail 15b is not shown in FIG. 5 but can be seen at FIG. 6A. A U-shaped connection plate 25a is shown fixedly attached to the rib 23. The U-shaped connection plate 25a is configured and fixedly attached to the rib 23 so that when, as illustrated in FIG. 5, the high-lift device is fully retracted, the U-shaped connection plate 25a receives the end 24a of the rail 15a to connect the rail 15a to the rib 23. Although not shown in FIG. 5, another U-shaped connection plate is configured and fixedly attached to the other side of the rib 23 to receive an end of the rail 15b to connect the rail 15b to the other side of the rib 23. A majority of the loads occurring on the high-lift device 3 can be transferred, in the retracted position, via the U-shaped connection plate 25a (and the not shown U-shaped connection plate receiving the end of the rail 15b on the other side of the rib 23) to the track 13 and hence to the structure of the airfoil 2, bypassing as such a load transfer through the carriage 14 and the rollers 21, 22. This is advantageous for the life time of the rollers 21, 22, as they are, in retracted position, unloaded. Also, this reduces wear of the rollers 21, 22 on the carriage 14, in retracted position, thus increasing the life time of the carriage 14 as well.

The carriage 14 is at one end provided with the at least one pair of rollers 21, and is at an opposite end thereof arranged for connection with the high-lift device 3. Advantageously, the carriage 14 has a shape corresponding to the shape of the track 13, resulting in an elongated shape of the carriage 14. A leading end of the carriage 14 can then be arranged to connect to the high-lift device 3, in particular to a trailing side 3T of the high-lift device 3.

Advantageously, the deployment system 4 comprises multiple guidance units 6. A single one of the guidance units 6 can be provided as a master guidance unit 6M, and the other ones of the guidance units 6 can be provided as slave guidance units 6S. In the embodiment of the high-lift device 3 shown in the figures, the deployment system 4 comprises four guidance units 6, typically one guidance unit 6 per meter spanwise length of the high-lift device 3 is provided. However, if requirements differ, this distribution can be different as well, so more or less guidance units per meter length can be possible. In this embodiment however, there are four guidance units 6, of which one guidance unit 6M is the master guidance unit, the other three guidance units 6S are the slave guidance units. The master guidance unit 6M has a carriage 14 that is arranged for a mounting to the high-lift device that does not allow any translational movement of the high-lift device with respect to the guidance unit. This can be seen for example in FIGS. 1, 2, 3a, 3b, 4a, 4b and FIG. 7 shows the connection of the carriage 14 of the master guidance unit in detail. The slave guidance units 6S have a carriage 14 that is arranged for a mounting to the high-lift device 3 that allows some relative movement of the high-lift device with respect to the guidance unit in a span wise direction only. This can be seen for example in FIGS. 1, 2, 3a, 3b, 4a, 4b and FIG. 8 shows the connection of the carriage 14 of the slave guidance unit 6S in detail.

Figure 7:
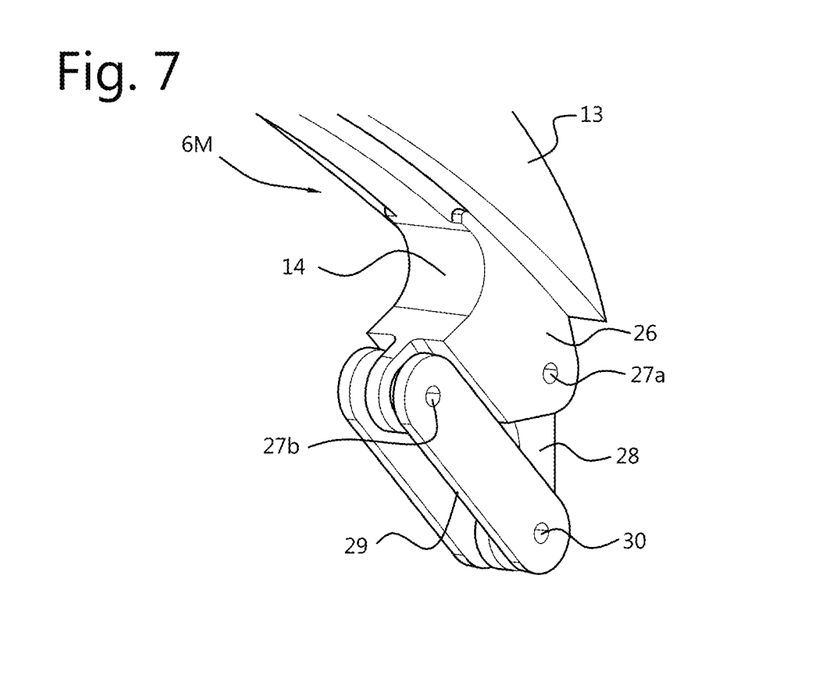
FIG. 7 a schematic detailed view of the connection of a master guidance unit to the high-lift device.

As can be seen in FIG. 7, the carriage 14 of the master guidance unit 6M is fixedly connected to the high-lift device 3, in particular to a trailing side 3T of the high-lift device 3. The connection with the high-lift device 3 is provided at a leading end 26 of the carriage 14. The leading end 26 of the carriage 14 is provided with two connection points 27a and 27b. The first connection point 27a is for direct connection to a connection lug 28 that is fixedly mounted to the high-lift device 3. The second connection point 27b is connected via a link 29 to the connection lug 28. The link 29 is connected to the connection lug 28 via a connection point 30. Axles extend through the bores of the connection lug 28 and through the bores providing the connection points 27a and 27b on the leading end 26. The axles are bearing mounted for allowing rotation. In principle, the connection between the leading end 26 and the connection lug 28 is a triangular connection, providing for a fixed connection. At least translational movement of the carriage 14 with respect to the high-lift device, in particular spanwise translational movement, is not possible with this configuration. So, a firm and fixed connection of the master guidance unit 6M to the high-lift device 3 is obtained.

Figure 8:
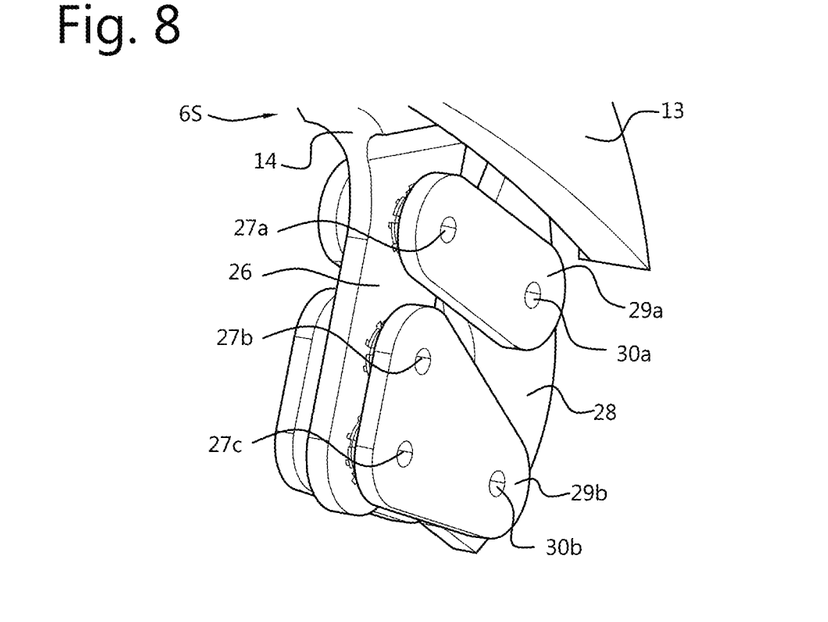
FIG. 8 a schematic detailed view of the connection of a slave guidance unit to the high-lift device.

FIG. 8 shows a connection of a slave guidance unit 6S to the high-lift device, wherein this connection allows translational movement, in particular in the spanwise direction. As can be seen in FIG. 8, the leading end 26 of the carriage 14 of the slave guidance unit 6S is provided as a T-shape of which a long leg of the T-shaped end 26 is connected to the high-lift device 3. On the high-lift device 3 there is, here too, a connection lug 28 mounted. The leading end 26 of the carriage 14 is here provided with three connection points 27a, 27b, 27c. For the connection to the connection lug 28 of the high-lift device 3, there are two links 29a, 29b provided. The first link 29a is at one end connected to a connection point 27a and at another end with the connection lug 28 at connection point 30a. The second link 29b is at one end connected to the connection points 27b, 27c and at another end with the connection lug 28 at the connection point 30b. All connections between the links 29a, 29b and the leading end 26 at one end and the connection lug 28 at the other end are bearing mounted allowing rotational motion around an axis transverse to the leading end 26 of the carriage. Due to the dual link connection, with links 29a, 29b, the connection between the leading end 26 and the high-lift device 3 is a flexible connection, allowing hinge movement of the carriage 14 with respect to the high-lift device 3 and also allowing translational movement in spanwise direction.

The links 29, 29a and 29b are here provided as comprising two parallel parts mounted at each side of the leading end 26 of the carriage. Axles extend through the bores of the connection lug 28 and through the bores providing the connection points 27a, 27b, 27c on the leading end 26. The axles are bearing mounted for allowing rotation. A significant amount of the loads acting on the high-lift device 3 can be easily transferred to the master guidance unit 6M via the fixed connection of the master guidance unit 6M.

By providing a connection of the slave guidance unit 6S that allows a hinging movement with respect to the connection lug 28, play or other small misalignments can easily be taken up by this construction without impairing the guide movement of the carriage 14 in the track 13. Furthermore, due to the fixed connection with the pair of connection links 29 of the master guidance unit 6M, the master guidance units 6M cannot move in a direction transverse to the adjustment path, thus a reliable following of the adjustment path can be obtained. From the loads acting on the high-lift device 3 only the in-plane loads (i.e. not spanwise oriented) can be transferred to the master guidance unit 6M via the fixed connection of the master guidance unit 6M to the high-lift device 3. As there is no stop or other fixation provided on the guidance unit 6, the actuation unit 5 holds the high-lift device 3 in the deployed position. A significant part of the loads occurring during flight are thus be taken up by the actuation unit 5 and the drive unit connected to the link and lever mechanism 7 via the drive rod 10. It is to be noted that at one or more of the connection points 27a, 27b, 30, 30a, 30b can be equipped with an eccentric feature to allow rigging of the high-lift device, such that the high-lift device can be adjusted to a final position with respect to the airfoil to eliminate tolerances. Such an eccentric feature may be an eccentric bore of the connection point, or an eccentric part of the axle extending through the connection points, or any other feature providing some eccentricity.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

LIST OF REFERENCE NUMERALS 1 nose
2 airfoil
3 high-lift device
3T trailing side of the high-lift device
4 deployment system
5 actuation unit
6 guidance unit
6M master guidance unit
6S slave guidance unit
7 link and lever mechanism
8 link
8L link centerline
9 lever
9L lever centerline
10 drive rod
11 lug
12 hinge between first and second lever
13 track
14 carriage
15a, 15b rails
16a, 16b opening
17a, 17b back side of rail
18a, 18b transverse sides of rail
20 receiving space
21 rollers
22 side rollers
23 rib of high-lift device
24a, end of rails
25a, 25b U-shaped connection plate
26 leading end of carriage
27a, 27b, 27c connection point on leading end of carriage
28 connection lug
29, 29a, 29b link
30, 30a, 30b connection point on lug

What is claimed is:

1. A deployment system for adjusting a leading edge high-lift device between a retracted position, in which, in use, the high-lift device is retracted with respect to an airfoil, and at least one deployed position, in which, in use, the leading edge high-lift device is deployed with respect to the airfoil, the deployment system comprising:
   a leading edge high-lift device;
   at least one actuation unit that is configured to actuate the leading edge high-lift device between the retracted position and the at least one deployed position, the at least one actuation unit comprising a link-and-lever mechanism of at least one link and one lever hingedly connected that are foldable in a V-shaped fashion in the retracted position of the leading edge high-lift device;
   at least one guidance unit that is configured to guide the leading edge high-lift device during adjustment between the retracted position and the at least one deployed position along an adjustment path;
   wherein the at least one guidance unit is independent from the at least one actuation unit;
   wherein each of the at least one guidance unit comprises a track configured for fixedly mounting to the airfoil and a carriage for cooperation with the track, wherein the carriage is movable lengthwise with respect to the track and is mounted to the leading edge high-lift device; and
   wherein each track of the at least one guidance unit is configured to extend through a trailing side of the leading edge high-lift device.

2. The deployment system according to claim 1, wherein the adjustment path is solely determined by a shape of the track of the at least one guidance unit.

3. The deployment system according to claim 1, wherein the leading edge high-lift device is a slat, wherein each carriage of the at least one guidance unit comprises at least one pair of rollers that are in contact with the track of the at least one guidance unit for movement over the track, such that the carriage can move with respect to the track to guide the slat during adjustment along the track.

4. The deployment system according to claim 1, wherein the carriage of each of the at least one guidance unit has a shape that corresponds to the shape of the track of the at least one guidance unit.

5. The deployment system according to claim 1, further comprising the leading edge high-lift device associated with an airfoil, wherein the track of the at least one guidance unit is configured for connection to a rib of the airfoil without penetration of a front spar of the airfoil.

6. The deployment system according to claim 1, wherein the track of each of the at least one guidance unit is comprised of two C-shaped rails that are mounted opposite each other, an opening of the C-shape facing each other.

7. The deployment system according to claim 6, wherein each carriage of each of the at least one guidance unit is receivable in the track of the at least one guidance unit, in a receiving space defined by the openings of the C-shaped rails.

8. The deployment system according to claim 6, wherein each carriage comprises at least one pair of rollers, each having a rotational axis oriented mainly in a direction transverse to the carriage, wherein the rollers are receivable in the track, in a receiving space defined by the C-shape of the two rails.

9. The deployment system according to claim 8, wherein the at least one pair of rollers is mounted to the carriage at an end of the carriage opposite of an end for connection to the leading edge high-lift device.

10. The deployment system according to claim 1, wherein the carriage of at least the at least one guidance unit further is provided with at least one pair of side rollers, having a rotational axis oriented mainly in an upward direction.

11. The deployment system according to claim 1, wherein each carriage of each of the at least one guidance unit is arranged for connection to the leading edge high-lift device at one end of the carriage.

12. The deployment system according to claim 1, wherein a connection between the carriage and the leading edge high-lift device of the at least one guidance unit comprises a link for hingedly mounting to the carriage at one end and for hingedly mounting to the leading edge high-lift device at an opposite end.

13. The deployment system according to claim 1, wherein a connection between the carriage and the leading edge high-lift device of each at least one guidance unit comprises two links for hingedly mounting to the carriage at one end and for hingedly mounting to the leading edge high-lift device at an opposite end.

14. The deployment system according to claim 1, wherein the at least one actuation unit comprises the link-and-lever mechanism having a link arranged for mounting to the leading edge high-lift device and a lever arranged for connection to a drive rod, such that, in use, when the drive rod is driven, the actuation unit is extended or retracted to adjust the leading edge high-lift device between the at least one deployed position and the retracted position.

15. The deployment system according to claim 1,
   wherein the at least one actuation unit is independent from the at least one guidance unit of the deployment system, and
   wherein the at least one actuation unit comprises the link-and-lever mechanism configured for connection to a drive unit at one end and for connection to the leading edge high-lift device at another end.

16. The deployment system of claim 1 wherein the leading edge high-lift device comprises at an internal rib corresponding to each track and wherein an end of each track extending through the trailing side of the leading edge high-lift device is configured to connect to the corresponding rib by a connection plate attached to the rib, the connection plate being configured to receive the distal end of the track to connect the distal end of the track with the rib with the leading edge high-lift device in the retracted position.

17. A deployment system for adjusting a leading edge high-lift device between a retracted position, in which, in use, the leading edge the high-lift device is retracted with respect to an airfoil, and at least one deployed position, in which, in use, the high-lift device is deployed with respect to the airfoil, comprising:
   a leading edge high-lift device;
   at least one actuation unit that is configured to actuate the leading edge the high-lift device between a retracted position and at least one deployed position;
   at least two guidance units that are configured to guide the leading edge the high-lift device during adjustment between the retracted position and the at least one deployed position along an adjustment path;

wherein the at least two guidance units each comprise a track configured for fixedly mounting to the airfoil and a carriage for cooperation with the track, wherein each carriage is movable with respect to the track and is mounted to the leading edge high-lift device;

wherein each track of the at least two guidance units is configured to extend through a trailing side of the leading edge high-lift device and wherein the at least one actuation unit comprises a link-and-lever mechanism of at least one link and one lever hingedly connected that are foldable in a V-shaped fashion in the retracted position of the leading edge high-lift device.

18. The deployment system according to claim 17, wherein the leading edge high-lift device is a slat, wherein the link-and-lever mechanism is adjustable between a folded position in a V-shaped fashion when the slat is in the retracted position and an extended position when the slat is in the deployed position.

19. The deployment system according to claim 17, wherein the leading edge high-lift device is a slat, wherein each carriage of the at least two guidance units comprises at least one pair of rollers that are in contact with each track of the at least two guidance units for movement lengthwise of the track, such that the carriage can move with respect to the track to guide the slat during adjustment along a lengthwise path defined by the track.

20. The deployment system of claim 17 wherein the at least two guidance units are independent from the at least one actuation unit and spatially apart from the at least one actuation unit.

21. A deployment system for adjusting a leading edge high-lift device between a retracted position, in which, in use, the high-lift device is retracted with respect to an airfoil, and at least one deployed position, in which, in use, the leading edge high-lift device is deployed with respect to the airfoil, the deployment system comprising:

a leading edge high-lift device;

at least one actuation unit that is configured to actuate the leading edge high-lift device between the retracted position and the at least one deployed position, the at least one actuation unit comprising a link-and-lever mechanism of at least one link and one lever hingedly connected that are foldable in a V-shaped fashion in the retracted position of the leading edge high-lift device;

at least one guidance unit that is configured to guide the leading edge high-lift device during adjustment between the retracted position and the at least one deployed position along an adjustment path;

wherein the at least one guidance unit is independent from the at least one actuation unit;

wherein each of the at least one guidance unit comprises a track configured for fixedly mounting to the airfoil and a carriage for cooperation with the track, wherein the carriage is movable lengthwise with respect to the track and is mounted to the leading edge high-lift device;

wherein the track of each of the at least one guidance unit is comprised of two C-shaped rails that are mounted opposite each other, an opening of the C-shape facing each other; and wherein each carriage of each of the at least one guidance unit is receivable in the track of the at least one guidance unit, in a receiving space defined by the openings of the C-shaped rails.

22. The deployment system according to claim 21, wherein each carriage comprises at least one pair of rollers, each having a rotational axis oriented mainly in a direction transverse to the carriage, wherein the rollers are receivable in the track, in a receiving space defined by the C-shape of the two rails.

* * * * *